E. CAMP AND A. F. SCHATZEL.
ATTACHMENT FOR TRANSMISSIONS.
APPLICATION FILED APR. 7, 1920.
1,433,176.
Patented Oct. 24, 1922.
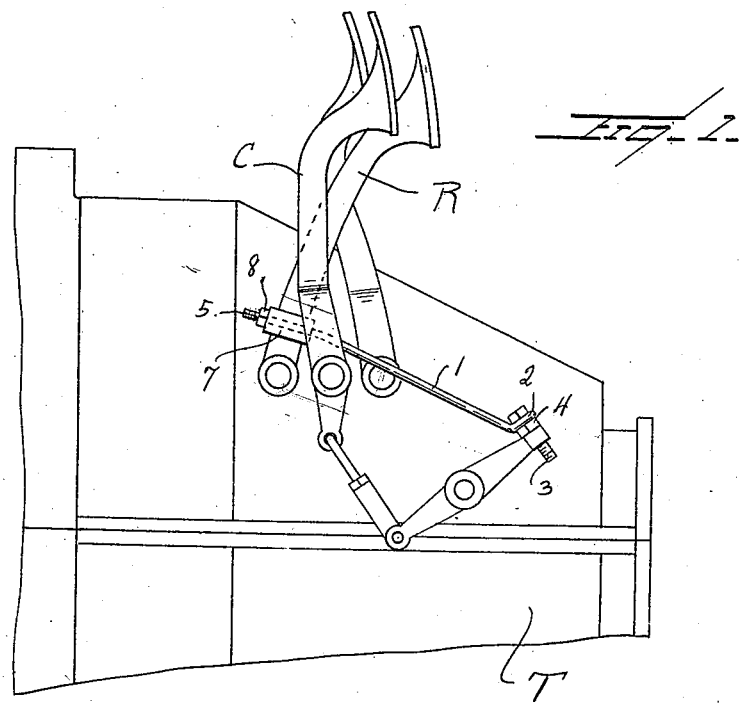
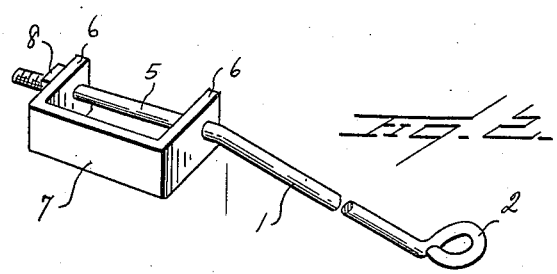
Inventors
E. Camp and
A. F. Schatzel
By Watson E. Coleman
Attorney Patented Oct. 24, 1922.

1,433,176

UNITED STATES PATENT OFFICE.

ERNEST CAMP AND ALBERT F. SCHATZEL, OF SAN DIEGO, CALIFORNIA.

ATTACHMENT FOR TRANSMISSIONS.

Application filed April 7, 1920. Serial No. 372,016.

*To all whom it may concern:*

Be it known that we, ERNEST CAMP and ALBERT F. SCHATZEL, citizens of the United States, residing at San Diego, in the county of San Diego and State of California, have invented certain new and useful Improvements in Attachments for Transmissions, of which the following is a specification, reference being had to the accompanying drawings.

This invention relates to improved attachments for transmissions and has relation more particularly to an attachment especially designed and adapted for use with a planetary transmission of a type employed in connection with the well known Ford automobile, and it is an object of the invention to provide a novel and improved device of this general character adapted to coact with the reverse pedal of the transmission and engage with the clutch lever whereby the reversing of the automobile through the transmission may be produced with only one motion.

The invention consists in the details of construction and in the combination and arrangement of the several parts of our improved attachment whereby certain important advantages are attained and the device rendered simpler, less expensive and otherwise more convenient and advantageous for use, as will be hereinafter more fully set forth.

The novel features of our invention will be hereinafter definitely claimed.

In order that our invention may be the better understood we will now proceed to describe the same with reference to the accompanying drawings, wherein:

Figure 1 is a fragmentary view in side elevation illustrating an attachment constructed in accordance with an embodiment of our invention and in applied position; and Figure 2 is a view in perspective of our improved attachment unapplied.

As disclosed in the accompanying drawings, T denotes a transmission of a type employed in connection with the well known type of Ford automobile and which embodies the conventional type of clutch lever and a reverse pedal and with which our improved attachment coacts.

Our improved attachment comprises an elongated rod 1 having one end portion provided with a laterally directed eye member or loop 2 arranged on a predetermined incline with respect to the rod 1 and which is adapted to be engaged with the clutch lever screw 3 and maintained applied thereto through the instrumentality of a clutch lever screw nut 4.

The opposite end portion of the rod 1 is disposed on a slight incline in a direction away from the eye member 2, and said portion 5 is loosely disposed through the extremities of the side arms 6 of a substantially U-shaped yoke 7. The free extremity of the portion 5 of the rod 1 has threaded thereon a nut 8 and which nut constitutes an adjustable stop. The yoke 7 straddles the lower portion of the reverse pedal R. The nut 8 is adjusted in a direction toward the yoke 7 until the proper tension is obtained to place the clutch pedal C, coacting with the transmission T, in a neutral position before the reverse brake band begins to take hold.

After our improved attachment has been applied, all that is necessary to do to make the car back up is to simply push on the reverse pedal R. As the pedal is pushed forward, the yoke 7, or more particularly the side arm 6 thereof, contacts with the nut 8 moving the rod 1 forwardly. This action neutralizes the transmission and as the pedal is moved farther it tightens the reverse transmission band, stopping this set of gears and whereby the vehicle is caused to run backwards.

It will be particularly noted that our improved attachment not only simplifies the reversing of the car, but it also eliminates the trouble that most drivers of Ford automobiles or the like encounter when they try to back up inasmuch as our improved attachment overcomes the possibility of engaging two sets of gears at the same time which would produce disastrous results to the transmission T or stop the engine, as it would be impossible for the shaft to move in two directions at the same time.

From the foregoing description, it is thought to be obvious that an attachment constructed in accordance with our invention is particularly well adapted for use by reason of the convenience and facility with which it may be assembled and operated, and it will also be obvious that our invention is susceptible to some change and modification without departing from the principles and spirit thereof, and for these reasons we do not wish to be understood as limiting ourselves to the precise arrangement and formation of the several parts herein shown in carrying out our invention in practice except as hereinafter claimed.

Having described and illustrated the invention, we claim:

In combination with a planetary transmission including a reverse pedal and a clutch lever, a rod provided with means to connect one end portion thereof to the clutch lever, a yoke straddling the reverse pedal, the opposite end portion of the rod being loosely disposed through the yoke, and an adjustable stop mounted upon the rod outwardly of the yoke.

In testimony whereof we hereunto affix our signatures.

ERNEST CAMP.
ALBERT F. SCHATZEL.